United States Patent [19]

Harvey

[11] 3,873,959
[45] Mar. 25, 1975

[54] SONAR WITH FLEXING DISTRIBUTION DEVICE FOR CONTINUOUSLY FLEXING CABLES

[75] Inventor: Arthur R. Harvey, Benicia, Calif.

[73] Assignee: The United States of America as represented by the Secretary of the Navy, Washington, D.C.

[22] Filed: Sept. 28, 1973

[21] Appl. No.: 401,917

[52] U.S. Cl. .................... 340/8 R, 174/86, 174/135
[51] Int. Cl. .............................................. H01s 3/80
[58] Field of Search ............ 174/69, 86, 135; 340/8

[56] References Cited
UNITED STATES PATENTS

| | | | |
|---|---|---|---|
| 3,028,445 | 4/1962 | Hurley | 174/86 |
| 3,318,994 | 5/1967 | Perrone et al. | 174/69 |
| 3,324,229 | 6/1967 | Ingmanson | 174/69 |

FOREIGN PATENTS OR APPLICATIONS 869,275  5/1961  United Kingdom ................. 174/86

Primary Examiner—Darrell L. Clay
Attorney, Agent, or Firm—R. S. Sciascia; Charles D. B. Curry

[57] ABSTRACT

A means for equally distributing the axial bending of continuously flexing sonar transducer cables. Two transducer cables are elongated in parallel relationship with one another and one on top of the other. A length of shrink tubing is shrunk over the cables starting at the sensor end. The cables are formed into a spiral shape and positioned on a special support member. The cables are then connected to their respective sensors.

1 Claim, 4 Drawing Figures

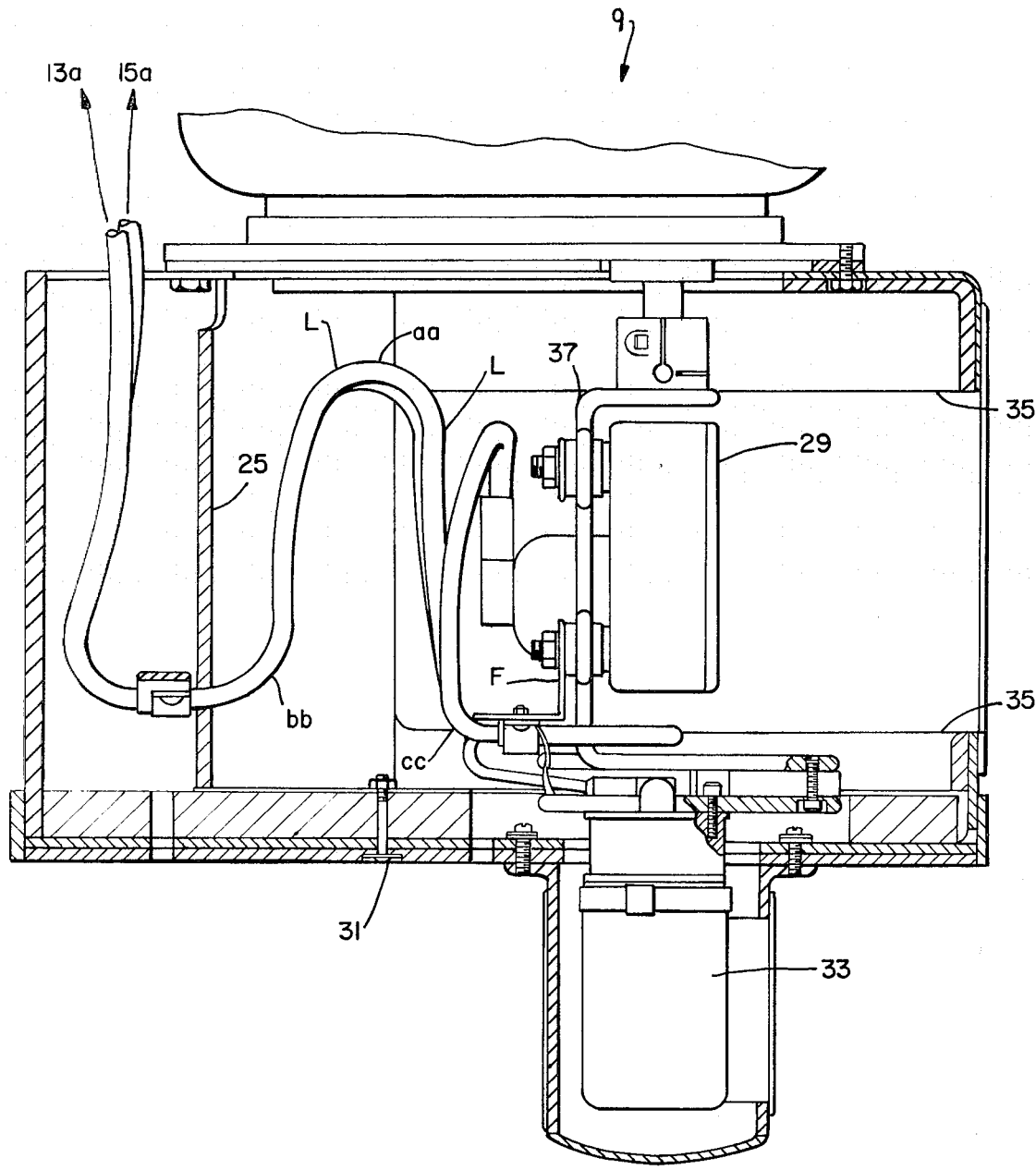
FIG_1  PRIOR ART

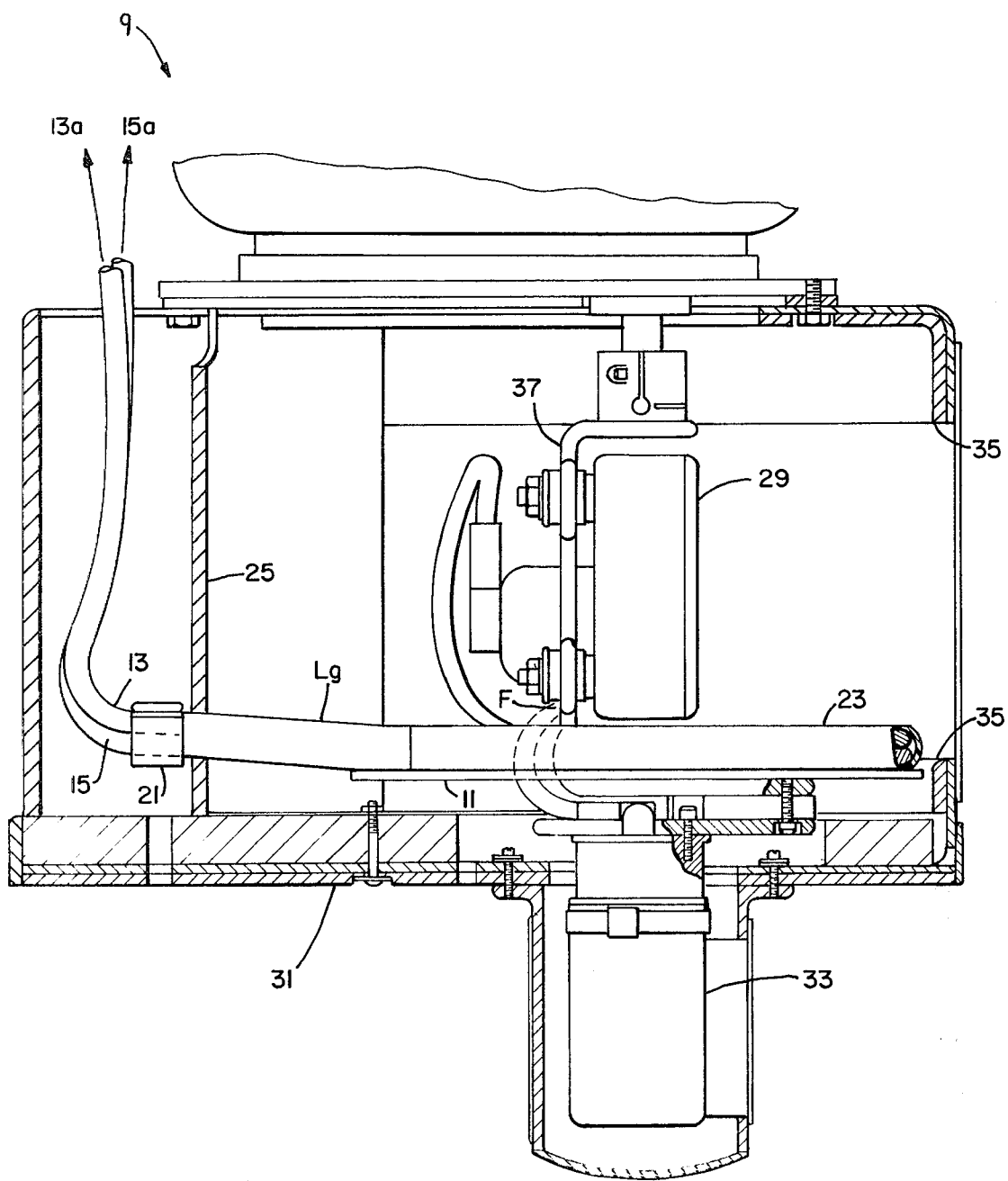
FIG_2

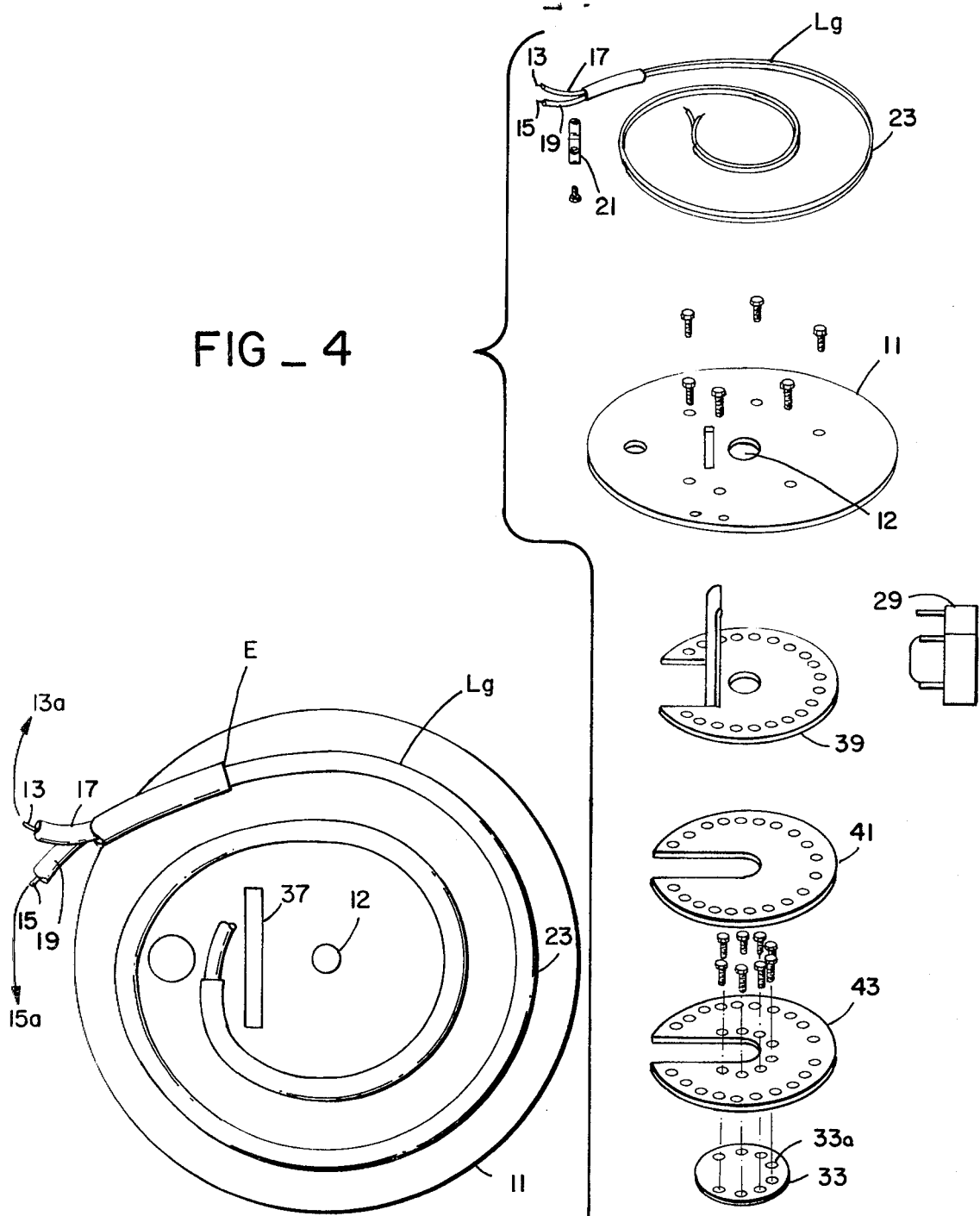

3,873,959

SONAR WITH FLEXING DISTRIBUTION DEVICE FOR CONTINUOUSLY FLEXING CABLES

BACKGROUND OF THE INVENTION

1. Field of the Invention

The invention relates generally to a flexing distribution method for continuously flexing sonar transducer cables and more particularly to a device which equally distributes the axial bending of sonar transducer cables to reduce the torsional stress on the cables.

2. Description of the Prior Art

Flexing cables such as those used on sonar transducers Pan and Tilt units of TV cameras and the like are subject to failure. Generally the existing cables described above fail in about 200 hours of use since there are no prescribed methods to prevent torsional loading. After failure, extensive and costly work is required to replace the damaged cable. If the above described unit is located shipboard the changing of the cables calls for either drydocking the ship or sending divers down under the ship to detach the transducer and accompanying assembly and bring it topside to change the cables in a dry area. This is difficult, time consuming and expensive since the transducer must be completely shut down and removed from operative service.

SUMMARY OF THE INVENTION

Briefly, the present invention is a means for equally distributing the axial bending of continuously flexing sonor transducer cables. Two transducer cables are elongated in parallel relationship with one another and one on top of the other. A length of shrink tubing is shrunk over the cables starting at the sensor end. The cables are formed into a spiral shape and positioned on a special support member. The cables are then connected to their respective sensors.

STATEMENT OF THE OBJECTS OF THE INVENTION

Primary object of the present invention is to provide a method of extending the life of continuously flexing transducer cables.

Another object of the present invention is to provide a method for equally distributing the axial bending of a transducer cable so as to reduce the torsional stress on the cables.

Another object of the present invention is to reduce the frequency of replacement of transducer cables due to transducer cable torsional stress failure.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a side section view of the sonar transducer illustrating the prior method of installing the flexing cables;

FIG. 2 is a side section view of the sonar transducer illustrating the attachment of the spiraled cable loop with jacket;

FIG. 3 is a plan view of the transducer of FIG. 2 taken along lines 3—3 of FIG. 2;

FIG. 4 is an exploded view of assembly diagram of the spiraled cable loop support table and jacket to be attached to the transducer illustrated in FIGS. 1 and 2.

DESCRIPTION OF THE PREFERRED EMBODIMENT

As background the prior method of installing flexible cables in a transducer is illustrated in FIG. 1. Referring to FIG. 1, transducer assembly 9 comprised of the sonar dome 31, projection 33, hydrophone 29 and hydrophone compartment 35 is illustrated in its neutral (000°) reference position. In operation transducer 9 oscillates back and forth plus or minus 90° from the (000°) degree reference point. The cable loop L allows for the oscillation of the transducer; loop L being limited to the available space within the sonar dome 31. The flexing of the cables is restricted to the loop L which is about 18 inches in length. Axial bending of loop L is localized at points $aa$, $bb$ and $cc$, while the torsional stress back and forth takes place along the entire length of loop L.

It has been found that when the cable was flexed for 70,000 cycles, allowing 10% for a safety margin the cable would require replacing after about 126 hours of operation.

Referring to FIGS. 2, 3 and 4, cables 13 and 15, each about eight feet long are extended parallel and horizontally with respect to each other. Cable 13 is attached to hydrophone 29 while cable 15 is attached to projector 33. About four feet of shrink fit tubing 23 is shrunk over unattached cables 13 and 15 near the sensor end 31. It should be noted that the proportional relationship of the cables to the tubing is the controlling factor rather than their actual lengths. Cables 13 and 15 are then formed into a spiral loop $L_g$, two turns, with the lower end of the hydrophone sensor 29 approximately in the center. Support table 11 is fastened to the oscillating sensor frame 31 to provide a support for the spiral loop $L_g$. One end of cables 13 and 15 which are located at center of the spiral loop $L_g$ are clamped to the frame 37 at point F on the table 11 thus retaining spiral tubing $L_g$ in a somewhat flat position and supporting table 11. The other end of cables 13 and 15 are then connected to their associated sensors, as described above, by an approved or desirable method. Cables 13 and 15 are then secured to table 11 by clamp 21. At the outer uncovered end of spiral loop $L_g$ an additional support tubing 17 and 19 is slipped over cables 13 and 15 respectively. The support tubing 17 and 19 extends to the edge E of shrink tubing 23. The purpose of support tubing 17 and 19 is to provide support and rigidness for cables 13 and 15 between the rotating support table 11 and the hold clamp 21. Tubing 17 and 19 may be made of "Tigon" or its equivalent. Plate 11 has an aperture 12 for positioning of hydrophone 29 attaching cables. Plate 11 is attached to projector base 33a via upper mounting bracket 39, spacer baffle 41 and mounting plate 43, as illustrated in FIG. 4 or in any other convenient manner. The mounting bracket 39 is a conventional spacer which has been modified to accept plate 11.

The cables 13 and 15 are threaded through cable dome baffle 25 and a clamp 21 is placed over both cable 13 and 15 and tubing 17 and 19 and clamped to the base of table 11. The spiral loop is adjusted to table 11 to turn plus or minus 180° from the neutral position without straining the spiral loop in either direction. Plate or table is attached to mounting brackets as illustrated in FIG. 4. The whole unit is then mounted on projector base 33a as described above. The outer end of cables 13 and 15 are then attached to their respective sensor cables 13a and 15a (not shown) by any standard well known method. Sensor cables 13a and 15a attach to hydrophone 29 and projector 33 respectfully.

The above described device and method is designed to equally distribute the axial bending of the transducer cables along the entire length of the cables instead of at concentrated axial bending points and as well as reducing the torsional stress on the cables. This virtually eliminates the cause of past cable failures.

The materials used in the unique invention are well known in the art and suitable for the required enviormental conditions. Other types of materials suitable for the particular environmental conditions could be used without degredation of the inventive concept.

What is claimed is:

1. A device comprising a rotatable sonar transducer having a frame and having at least two transducer cables maintaining an approximately equal distribution of the axial bending moments in said cables throughout the entire length of said cables:

a. a rotatable flat circular supporting table rotatably connected to said frame of said sonar transducer with said table having the same axis of rotation as said sonar transducer and traverses the same angle as said sonar transducer during the operation of said sonar transducer;

b. said transducer cables supported by said table, one of said cables being in contact with said table and the other of said cables lying on top of said cable with their centerlines in parallel with every tangential plane which includes a point on each centerline at every tangent perpendicularly intersecting the supporting surface of said table;

c. a form fitting sheath encasing said transducer cables maintaining said perpendicular relationship of said centerlines with respect to said table surface while said transducer and said table are in rotational motion;

d. first means connecting one ends of said cables to said frame for rotation with said frame and second means maintaining the other ends of said cables in a fixed spacial position;

e. said sheathed cables being positioned upon said table and forming a spiral loop configuration with the geometrical center of said loop being located at about the center of rotation of said table;

f. concentric adjacent segments of said sheathed cables being spaced from each other through said spiral loop configuration; and g. whereby rotation of said spiral loop in one direction about said axis of rotation causes said spiral loop to tighten and, consequently, said spacing to decrease and rotation in the opposite direction causes said spiral loop to loosen and, consequently, said spacing to increase.

* * * * *